(12) United States Patent
Heinemann et al.

(10) Patent No.: US 9,499,099 B2
(45) Date of Patent: Nov. 22, 2016

(54) MOTOR VEHICLE HAVING A CAMERA MONITORING SYSTEM

(71) Applicant: Audi AG, Ingolstadt (DE)

(72) Inventors: Patrick Heinemann, Kösching (DE); Michael Schlittenbauer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/654,428

(22) PCT Filed: Nov. 12, 2013

(86) PCT No.: PCT/EP2013/003398
§ 371 (c)(1),
(2) Date: Jun. 19, 2015

(87) PCT Pub. No.: WO2014/094941
PCT Pub. Date: Jun. 26, 2014

(65) Prior Publication Data
US 2015/0343950 A1     Dec. 3, 2015

(30) Foreign Application Priority Data
Dec. 22, 2012 (DE) .................. 10 2012 025 322

(51) Int. Cl.
*B60R 1/00* (2006.01)
*H04N 7/18* (2006.01)
*H04N 5/247* (2006.01)

(52) U.S. Cl.
CPC ............. *B60R 1/00* (2013.01); *H04N 5/247* (2013.01); *H04N 7/181* (2013.01); *B60R 2300/105* (2013.01); *B60R 2300/303* (2013.01); *B60R 2300/60* (2013.01); *B60R 2300/802* (2013.01); *B60R 2300/8046* (2013.01)

(58) Field of Classification Search
CPC .................................. B60R 1/00; H04N 5/247
USPC ........................................................ 348/148
See application file for complete search history.

(56) References Cited

U.S. PATENT DOCUMENTS 6,424,273 B1   7/2002   Gutta et al.
6,593,960 B1   7/2003   Sugimoto et al.
(Continued)

FOREIGN PATENT DOCUMENTS

CN   101 269 635 A   9/2008
DE   102 21 513   3/2004
(Continued)

OTHER PUBLICATIONS

Chinese Search Report issued on Dec. 7, 2015 with respect to counterpart Chinese patent application 201380025916.6.
(Continued)

*Primary Examiner* — Jeffery Williams
(74) *Attorney, Agent, or Firm* — Henry M. Feiereisen LLC

(57) ABSTRACT

A motor vehicle includes at least two cameras spaced apart from each other at least in the longitudinal direction of the vehicle for detecting the environment of the motor vehicle, at least one processing device and at least one display device, wherein the processing device is configured to generate at least one target image from the camera data of the at least two cameras, wherein the target image includes two image regions arranged next to each other, wherein the content of the first image region is determined from the image data of the first camera and the content of the second image region is determined from the image data of the second camera, and wherein the processing device is configured to control the display device to output the target image.

13 Claims, 5 Drawing Sheets

(56) References Cited

U.S. PATENT DOCUMENTS

| | | |
|---|---|---|
| 7,136,754 B2 | 11/2006 | Hahn et al. |
| 7,576,767 B2 | 8/2009 | Lee et al. |
| 7,859,565 B2 | 12/2010 | Schofield et al. |
| 2006/0017807 A1* | 1/2006 | Lee .................. B60R 1/00 348/36 |
| 2009/0079553 A1 | 3/2009 | Yanagi et al. |
| 2011/0175752 A1 | 7/2011 | Augst |
| 2013/0154816 A1 | 6/2013 | Giesler et al. |
| 2013/0201335 A1 | 8/2013 | Heinemann |

FOREIGN PATENT DOCUMENTS

| | | |
|---|---|---|
| DE | 102 97 590 | 12/2004 |
| DE | 600 25 864 | 8/2006 |
| DE | 102007033735 | 8/2008 |
| DE | 102008034594 | 1/2010 |
| DE | 102010020201 | 5/2011 |
| DE | 102011005102 | 7/2011 |
| EP | 1 672 588 | 6/2006 |
| EP | 2 042 374 | 4/2009 |
| EP | 2 045 133 | 4/2009 |
| EP | 2 484 558 | 8/2012 |
| JP | 2003-242366 A | 8/2003 |

OTHER PUBLICATIONS

Translation of Chinese Search Report issued on Dec. 7, 2015 with respect to counterpart Chinese patent application 201380025916.6.
International Search Report issued by the European Patent Office in International Application PCT/EP2013/003398 on Jan. 17, 2014.

* cited by examiner

MOTOR VEHICLE HAVING A CAMERA MONITORING SYSTEM

CROSS-REFERENCES TO RELATED APPLICATIONS

This application is the U.S. National Stage of International Application No. PCT/EP2013/003398, filed Nov. 12, 2013, which designated the United States and has been published as International Publication No. WO 2014/094941 A1 and which claims the priority of German Patent Application, Serial No. 10 2012 025 322.2, filed Dec. 22, 2012, pursuant to 35 U,S.C. 119(a)-(d).

BACKGROUND OF THE INVENTION

The invention relates to a motor vehicle including at least two cameras spaced apart from each other at least in the longitudinal direction of the vehicle for detecting the environment of the motor vehicle, at least one processing device and at least one display device, wherein the processing device is configured to generate at least one target image from the camera data of the at least two cameras, wherein the target image includes two image regions arranged next to each other, wherein the content of the first image region is determined from the image data of the first camera and the content of the second image region is determined from the image data of the second camera, and wherein the processing device is configured to control the display device to output the target image.

Camera monitoring systems gain increasing importance for modern motor vehicles. One of the applications of a camera-monitoring-system is to utilize cameras and monitors to replace conventional rearview mirrors. The replacement of a conventional mirror by one or more cameras arranged on the motor vehicle as well as at least one display device ensures a reliable representation of defined regions of the environment behind the vehicle, independent on the driver's seating position. Under certain conditions camera-monitoring-systems arranged on the outside of the motor vehicle may also obviate the arrangement of mirrors on the outside of the motor vehicle. This is particularly advantageous with regard to optimizing aerodynamic drag as well as an attractive design of the motor vehicle.

For safety reasons and due to legal requirements in some countries, the field of view as well as the display size of objects within the display have to correspond to the display size of conventional mirrors. Hence, the camera of the system has to be limited to a certain field of view and often has to be fixed so as to protrude far beyond the vehicle contour to avoid the vehicle contour from obscuring the relevant field of view.

Limiting the field of view to the field of view that corresponds to the field of view of a conventional mirror creates a large dead angle that is neither covered by the head rotation of the driver nor by the camera. Furthermore, the requirement of placing cameras at outermost points of the vehicle strongly reduces the advantages of using a camera-monitoring-system as opposed to conventional mirrors, i.e., the improvement of aerodynamics and better design compatibility.

While it is possible to reduce the dead angle by extending the field of view of the camera, this, however, leads to a reduction in size of the displayed images which critically impacts safety. Furthermore, this solution does not contribute to an improvement of the aerodynamics or a better design compatibility.

SUMMARY OF THE INVENTION

Thus, the invention is based on the object to provide a motor vehicle with an improved camera monitoring system.

The object is accomplished according to the invention in that in a motor vehicle of the aforementioned type, the first camera is a rear area camera for imaging the rear area of the motor vehicle and the second camera is a side camera for wide angled detection of a lateral zone of the motor vehicle, wherein the target image displays a fixedly predefined spatial angle of the rear area camera in the first image region and a fixedly predefined spatial angle of the side camera in the second image region, wherein the displayed spatial angle of the side camera and of the rear area camera overlap at least in a zone behind the motor vehicle.

The idea underlying the invention is that in order to display the field of view of a conventional mirror and to display the dead angle, two separate cameras are used, whereas a joint target image is created from the data of both cameras which, in a first area, displays the image data of the first camera which particularly corresponds to the field of view of a conventional mirror. These are displayed in a display area which advantageously has the size of a conventional mirror. In a neighboring further area of the target image, image data of the second camera are displayed, which in particular display the dead angle.

Within the motor vehicle according to the invention the driver is provided with a particularly intuitive display possibility of the information regarding the rear area of the vehicle. Thus, the target image may for example be displayed so that the second area is situated at the site of the image that would correspond to an aspherical area in a conventional mirror.

Cameras that can be used as side cameras include so called top view cameras which are already present in many modern motor vehicles. Such top view cameras are wide-angle cameras that are generally used to enable the display of the environment of the motor vehicle from above. Alternatively, it is of course also possible to use side cameras that are exclusively assigned to the camera monitoring system which serves as a mirror substitute. To ensure a good coverage of the dead angle, it is also advantageous when the side camera records a large spatial angle. Especially when also using top view cameras it is advantageous when the camera's viewing direction is substantially arranged vertical relative to the driving direction of the motor vehicle. In this case, the camera may be arranged very close to the vehicle contour or may also be integrated into the vehicle contour without vehicle components obscuring essential parts of the displayed spatial angle.

Because the lateral area of the motor vehicle is already detected by the side cameras, it is possible to relocate the rear area camera into the rear area of the motor vehicle. This is especially advantageous because the rear area camera is in this case situated closer to the contour of the motor vehicle without having large parts of the spatial angle that is displayed by the rear area camera obscured by components of the motor vehicle. For instance, a camera that is situated at the rear of the motor vehicle may easily be integrated into the vehicle geometry. In this case, no components of the vehicle are arranged within the spatial angle that is displayed by the camera, even though the camera is not necessarily spaced apart from the vehicle contour. Thus, it is for example possible to integrate the rear area camera into the rear lights.

In the simplest case, it can be provided that a side camera, a rear camera and a display device are arranged on at least one side of the motor vehicle. These three components communicate with a processing device, which processes the image data of both cameras and displays a target image on the display device. The target image is divided into two adjacent image regions. In a first image region, which may for example be larger than the second image region, an image determined from the rear area camera's data, is displayed. This image may in particular correspond to a spatial angle in the rear area of a motor vehicle that is displayed by a conventional mirror. The angular range detected by the rear area camera can be larger than the angular range displayed in the first image region. In order to nevertheless achieve a display that corresponds to the field of view and the display size of a conventional mirror, only the part of the image data is used which corresponds to the spatial angle that is displayed by a conventional mirror. This is easily possible because in digital cameras each pixel corresponds to a fixed spatial angle. The spatial angular range to be displayed has a fixed position relative to the motor vehicle. This makes it possible to select the spatial angle by predefining the pixels of the rear area camera to be displayed. The display device can be configured to have a sufficiently high resolution so that the number of pixels along the height and width in the first image region equals exactly the height and width of the portion of the image of the rear area camera. Alternatively the portion of the image of the rear area camera to be displayed may also be scaled to adapt the image size and resolution to the first area.

In order to calculate the target image that is displayed on the display device, the processing device adds a second image region adjacent to the first image region. In this second image region image data of the side camera are displayed. As mentioned above, it is advantageous when the side camera displays a large spatial angle, particularly in horizontal direction. On the one hand, this is advantageous because the side camera may additionally be used as a top view camera; on the other hand it is possible to arrange the camera substantially vertical relative to the vehicle body surface. This allows arranging the camera very closely to the vehicle body contour without the vehicle body obscuring large parts of the spatial angle that is imaged by the camera. However, a wide angular range imaged by the side camera also leads to the fact that only a section of the spatial angle is relevant for a system that is intended to display the rear area of the vehicle. The processing device now selects those pixels that correspond to a dead angle to be displayed in the second image region. This dead angle corresponds to an area that is neither displayed in the first image region nor is easily visible for the driver. Especially with regard to the side camera, it has to be taken into account that due to the fact that large angular ranges are to be displayed in this case, the display may not be gnomonic. In this case, the image portion, which corresponds to a desired spatial angular section, is not necessarily rectangular. Particularly during the processing of the image data of the side camera, i.e., the generation of the second image region, it is thus possible that the processing device calculates a usually rectangular second image region from a non-rectangular image region of the side camera. Such a calculation, however, is easily possible with known image processing methods, particularly through image rectification. In addition, also the second image region displays a zone of the environment of the motor vehicle that has a fixed position relative to the motor vehicle. This position corresponds to a fixed number of pixels, even in the case of a non-gnomonic display. A selection of the image region to be processed and of the processing itself, once determined, can thus always be used without any modifications in order to calculate the second image region.

Of course it is also possible to use a common processing device for all cameras used to collect data for an image of a left hand and a right hand display device that replace a left hand or right hand conventional mirror. In addition, it is also possible to use a single rear area camera on the vehicle for generating two target images, one for the left rear area and one for the right rear area. The same camera can, of course, also be used for generating an image that corresponds to an interior rearview mirror.

It is advantageous when the detection angle of the side camera is larger than 90°, particularly larger than 120° in the horizontal plane. Larger detection angles generally allow alignment of the side camera at a steeper angle relative to the driving direction, thus avoiding that large parts of the rear area are not displayed. As mentioned above a steeper angle relative to the driving direction has the advantage that the camera can be arranged closer to the vehicle contour or can be integrated into the vehicle contour without components of the motor vehicle obscuring the image region. Large detection angles also have the advantage that the side camera, beside its use in a virtual mirror, can also be used as a top view camera. In particular, fisheye optics may be used; alternatively also the use of a wide angle or super wide angle optics is possible.

The displayed angle of the side camera, i.e., the angle which is displayed in the image region of the target image can, in the horizontal plane, be smaller than 90°, particularly smaller than 60°, in particular smaller than 45°. The main objective is to display the dead angle in a way so that essential details can be recognized. A display of large angular ranges, particularly larger than 90°, is not useful for displaying the rear area. A display of large angular ranges would also mean that either a very large second image region has to be used or that the display of the second image region is strongly distorted. The angular range that is not easily visible for the driver and that is not displayed in the first image region, is normally displayed with an angle of view of 45° in the horizontal plane.

For a virtual rearview mirror it is advantageous, when the image regions are of a fixed predetermined size. On the one hand, legal requirements can be reliably met; on the other hand, an optimum of the field of view can be reliably achieved with such fixedly predetermined image regions. Especially the operation of security-relevant systems of a motor vehicle should be simple and intuitive. When the displayed spatial angles for each of the two image regions and also the size of the image regions are preset, the complete image calculation can be predetermined. That means that the same operations are always applied to the image data of the camera images to generate the target image from the two camera images. This renders the calculation of the target image particularly simple and also very robust.

Especially when using fisheye lenses for the side camera, the resulting image in the second image region may be strongly distorted. This is the region in which the dead angle is to be displayed for the virtual rearview mirror of the motor vehicle according to the invention. However, this dead angle is a border region of the display and is thus particularly strongly distorted. This leads in particular to a strong distortion of vertical lines which, in particular when displaying moving images, do not correspond to viewing habits of humans. Therefore, it is advantageous when the processing device is configured for rectifying the side camera's image data. This calculation is also very simple when the displayed spatial angle and the size of the second image region are preset. In this case a weighted sum can be formed in the second image region for each pixel of the target image over a few number of pixels of the data of the side camera, wherein the weighting factors are predetermined. Alternatively it is also possible to first rectify the side camera's image and to then select the image section that is displayed in the second image region of the target image.

The angular range of the dead angle can be significantly larger than the angular range that corresponds to a conventional rearview mirror and is displayed in the first image region. When every pixel is to correspond to a spatial angular range that is of similar size in both areas, the second image region would have to have a larger dimension than the first image region. This would lead to a very large display device. However, the area of the dead angle normally has to provide less information for the driver than the area displayed by a conventional rearview mirror. For a driver of the motor vehicle according to the invention, it is of particular importance to know whether further objects, especially further motor vehicles, are located within the dead angle. It may therefore be advantageous when the processing device is configured to compress the image data of the side camera in horizontal direction to produce the image data of the second image region. Although this leads to the fact that less information regarding the dead angle is provided, the information is still sufficient to easily determine that, for example, a second motor vehicle is located within the dead angle.

It is particularly advantageous when the processing device is configured to generate a marking in the target image that marks the border between both image regions. Such a marking makes it easier for the driver to differentiate between both image regions. With this it can always be clearly recognized which area of the image corresponds to the classical rearview mirror and which area displays image data from the dead angle. This is particularly advantageous for two reasons. On the one hand, the driver immediately recognizes when a further object, that moves both relative to the own motor vehicle as well as relative to the environment, is located within the dead angle. Because objects within the dead angle are located either behind the vehicle or already next to the vehicle, recognition of such objects, particularly when changing lanes, is essential. On the other hand the driver is clearly informed by this marking that the display in the second image region was captured from another angle and is possibly displayed distorted. Thereby, distances are perceived differently.

It is advantageous when the target image is displayed over the entire surface of the display device. The virtual rearview mirror according to the invention is a safety-relevant system. It is thus advantageous when this system is kept simple and has separate display elements.

The motor vehicle can have two side cameras arranged laterally on the motor vehicle, wherein one of the side cameras is situated on the left side of the motor vehicle in driving direction and the other one on the right side of the motor vehicle in driving direction. In this case, dead angles on the left side and the right side of the motor vehicle can be displayed. The vehicle can also have two display devices and the processing device can be configured to generate a first target image, to control the first display device to display the first target image, to generate a second target image and to control the second display device to display the second target image, wherein the second image region of the first target image displays image data of the first side camera and the second image region of the second target image displays image data of the second side camera.

Alternatively, the motor vehicle can have two display elements and two processing devices, wherein the first processing device can be configured to generate a first target image and to control the first display device to display the first target image, wherein the second image region of the first target image displays image data of the first side camera and the second processing device can be configured to generate the second target image and to control the second display device to display the second target image onto the second display device, wherein the second image region of the second target image displays image data of the second side camera.

The field of view of a conventional exterior rearview mirror that is to be displayed by a virtual rearview mirror of the motor vehicle according to the invention is essentially delimited on one side by a straight extension of the side of the vehicle. Such an area can be displayed particularly well when the motor vehicle has two rear area cameras, wherein the first image region of the first target image displays image data of the first rear area camera and the first image region of the second target image displays image data of the second target image.

BRIEF DESCRIPTION OF THE DRAWING

Further advantages and details of the invention will become apparent from the exemplary embodiments described below and by way of the drawings. It is shown in.

DETAILED DESCRIPTION OF PREFERRED EMBODIMENTS

Figure 1:
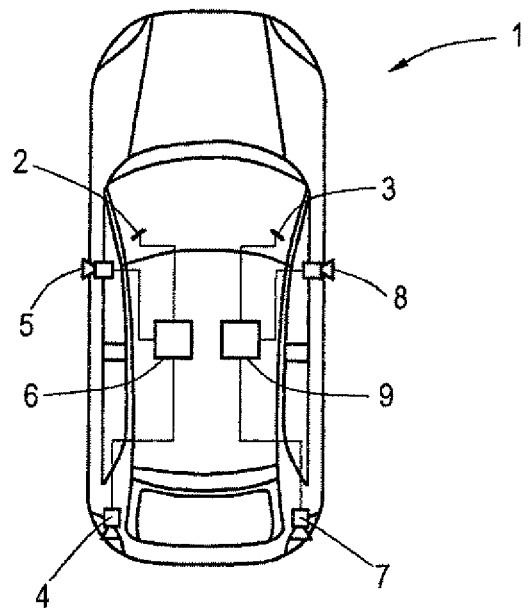
FIG. 1 an embodiment of a motor vehicle according to the invention.

FIG. 1 shows a schematic diagram of a motor vehicle 1. The motor vehicle includes two display devices 2, 3, two side cameras 5, 8, two rear area cameras 4, 7 and two processing devices 6, 9. The generation of the target image is explained using the processing line on the left hand side that displays the target image on the display device 2 as example. The following explanation, however, also applies to the generation of the target image for the display device 3. The processing device 6 communicates with the rear area camera 4 and the side camera 5 and the display device 2. The schematic illustration in FIG. 1 shows a direct connection between the processing device 6 and the further components. Alternatively, it is also possible that such a connection is implemented through an in-vehicle bus, for instance a CAN-bus.

The processing device 6 receives image data from the rear area camera 4 and the side camera 5, calculates a target image and controls the display device 2 so that the display device displays the target image. The target image includes two regions, wherein the first image region is calculated from data provided by the rear area camera 4 and the second image region from data provided by the side camera 5. The processing device furthermore causes display of a marking between both image regions. The target image thus includes a first image region, a marking and a second image region.

In the following the generation of the first and the second image region is explained in more detail. The rear area camera 4 captures an angular range that is larger than the angular range required to display a range displayed by a conventional exterior rearview mirror. This is explained in more detail below with respect to FIGS. 9 and 10. The image data of this image are provided to the processing device 6. Because the rear area camera 4 does not have extensive camera angles, the image of the rear area camera 4 is not, or only slightly, distorted. Therefore the processing of the data of the rear area camera 4 in the processing device 6 is limited to transferring the image data that correspond the spatial angle which would be displayed by a conventional rearview mirror, into the first image region. When the dimensions of the image data that correspond the spatial angle, precisely correspond to the pixel-size of the target image region, this display can directly take place by copying the pixel information. In the case these dimensions do not match, a scaling may be performed that adapts the resolution of the used section of the image data of the rear area camera 4 to the resolution of the section of the display device 2 that is available for displaying the first image region, The side camera 5 provides image data for the processing device 6 that are used to calculate the second image region. In order to display a large angular range, the side camera 5 is constructed as a camera with a fisheye lens. The camera's viewing direction is substantially perpendicular to the vehicle body. The image region that corresponds to the dead angle is therefore situated at the left border of the image of the side camera. The mere copying and/or scaling of the left part of the camera's image to calculate the second image region would lead to a strongly distorted display, where the displayed horizontal angular range at the upper and lower border of the image is larger than in the centre. Therefore the image of the side camera 5 is to be rectified by the processing device 6. Furthermore, the spatial angle of the dead angle to be displayed in the second image region is larger than the spatial angle which is displayed in the first spatial region. If these spatial angles were displayed in the same manner, the second image region would thus be substantially wider than the first image region. The first image region, however, includes the information displayed by a conventional rearview mirror. The second image region is only intended for determining whether further moving objects are situated within the dead angle. Therefore, the rectified image of the side camera 5 is additionally compressed horizontally prior to being transferred into the second image region.

The rectification of the image of the side camera 5, the horizontal compression as well as a potentially required adaptation of the resolution can be combined by selecting a single pixel of the side camera's image for every pixel of the second image region. However, in order to achieve a better image quality, a weighted sum of each pixel of the second image region is calculated from multiple points of the image of the side camera 5. Because the second image region always displays the same angular section of the image of the camera 5 and the region also always has the same size, once determined point coordinates and weighting factors can always be reused. Thus, no complex operations are required to calculate the target image, but only a weighted sum for a small number of points of the image data of the rear area camera 4 or the side camera 5 has to be generated for every pixel of the first and second image region.

The calculated target image is written into a buffer, which is provided to the display device. The display device displays the image.

Figure 2:
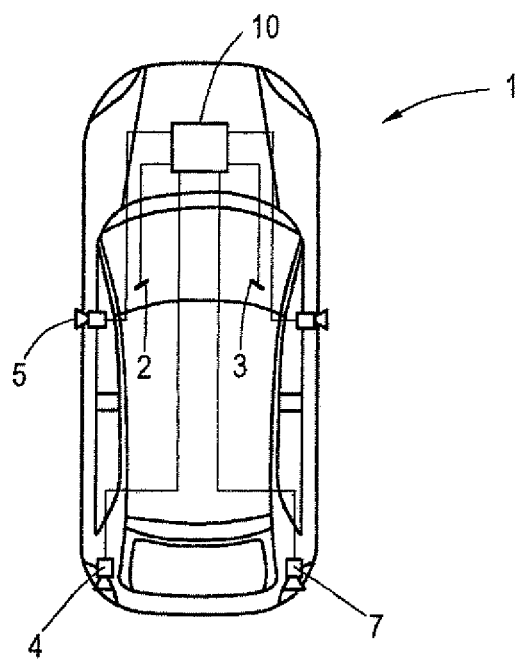
FIG. 2 a further embodiment of a motor vehicle according to the invention.

FIG. 2 shows a further embodiment of a motor vehicle. Here, a common processing device 10 is used for the calculation of the target image for the left display device 2 and the left display device 3. The processing device 10 receives the signals of the left and the right side camera 5, 6 and the left and right rear area camera 4, 7. The processing device 10 calculates a target image from the data of the left cameras 4, 5 and controls the left display device 2 to display this image and calculates a further target image from the data of the right cameras 7, 8 and controls the display device 3 to display the target image. The calculation takes place as described for FIG. 1.

The use of a common processing device is particularly useful, when a processing device is already present within the motor vehicle, which for example is used for data processing of driver assistance systems. Oftentimes, the construction of a motor vehicle is easier and more cost-effective when a common processing device is used for various computational tasks.

Figure 3:
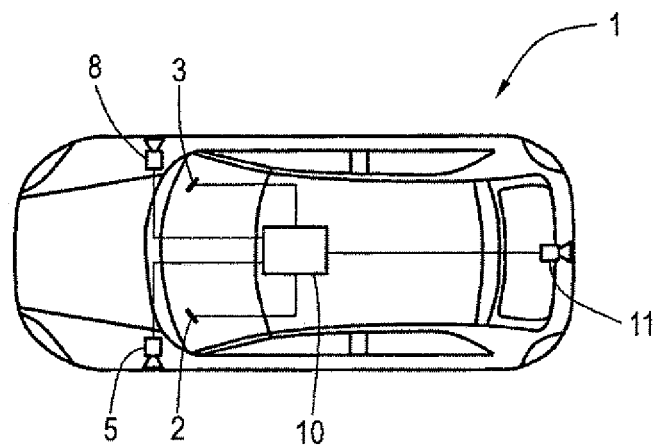
FIG. 3 a third embodiment of a motor vehicle according to the invention.

FIG. 3 shows a third embodiment of a motor vehicle including a virtual mirror. The essential difference to the motor vehicle of FIG. 2 is that, here, data of a rear area camera 11 are used to calculate both target images. With this, a first target image is calculated from the data of the side camera 4 and from a partial image of the rear area camera 11 and is displayed on the display device 2, and a further target image is calculated from the image data of the side camera 8 and of another partial image of the rear area camera 11 and is displayed on the display device 3.

Figure 4:
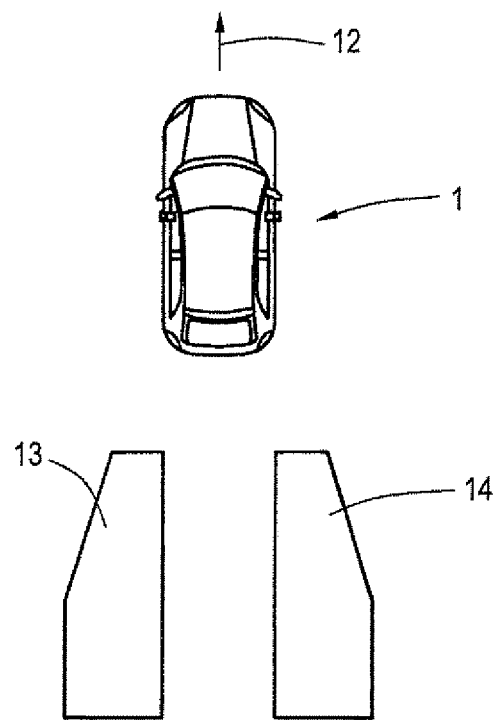
FIG. 4 a motor vehicle with the required field of view of a conventional mirror, FIG. 5 a schematic illustration of the viewing angle when using a camera having the position and viewing angle of a conventional mirror, FIG. 6 the generated image for a driving situation with the camera field of view of FIG. 5, FIG. 7 a schematic illustration of the viewing angle of a camera with extended angular range, FIG. 8 the same driving situation as shown in FIG. 6, however, with the camera field of view shown in FIG. 7, FIG. 9 a schematic illustration of the camera angle of a motor vehicle according to the invention, and FIG. 10 the same traffic situation as shown in FIG. 6 and FIG. 8, but recorded with camera angles as shown in FIG. 9.

FIG. 4 schematically shows which zones in the motor vehicle's environment have to be displayed by the virtual mirror as a minimum requirement. In the case of motor vehicle 1 with driving direction 12, these are zones 13 and 14. Zones 13, 14 substantially correspond to the areas that would be visible with a conventional rearview mirror. These zones 13, 14 are to be displayed analogously to a display by a conventional mirror.

Figure 5:
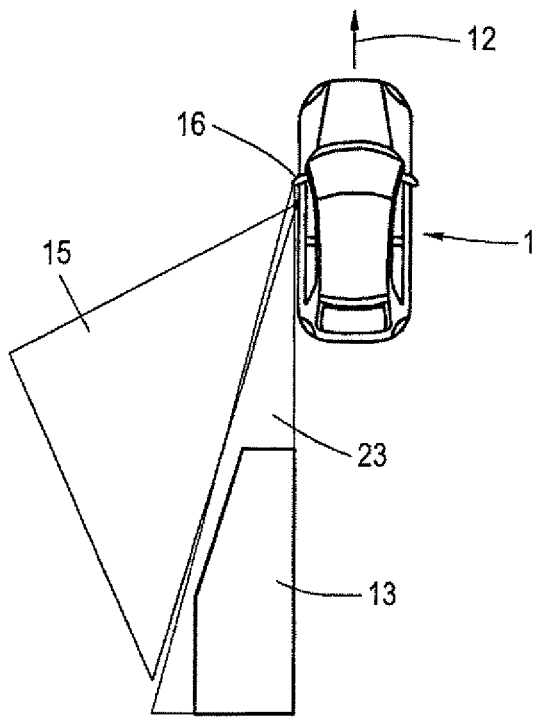

In this context FIG. 5 schematically shows the viewing angle of a camera-monitoring-system that emulates the function of a conventional mirror. The camera 16 is slightly spaced apart from the vehicle body to avoid that the vehicle body covers large parts of the image region. Reference numeral 12 again designates the driving direction of the motor vehicle 1. At least zone 13 is to be displayed, wherein the display size of objects on the display is to be analogous to a conventional mirror. This is achieved by choosing a correspondingly narrow camera angle 23 of the camera 16.

This arrangement has several disadvantages. On the one hand, the dead angle 15 is not displayed and is not visible for the driver. As a consequence, as in a conventional mirror, important information is not provided to the driver. To display zone 13 by camera 16, the camera has to be placed in the front area of the vehicle and is spaced relatively far from the vehicle body. Both can be disadvantageous in terms of aerodynamic drag and the design of the motor vehicle.

Figure 6:
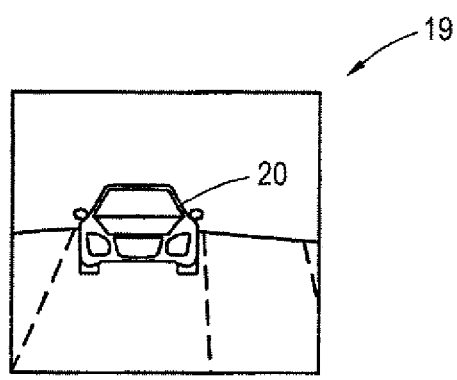

FIG. 6 shows an image 19 of a traffic situation that is generated by the virtual rearview mirror of FIG. 5. Here, only a motor vehicle 20 can be seen that drives at some distance behind the own motor vehicle. Another motor vehicle that is situated within the dead angle is not visible in FIG. 6 because the virtual rearview mirror of FIG. 5 does not enable a display of the dead angle.

Figure 7:
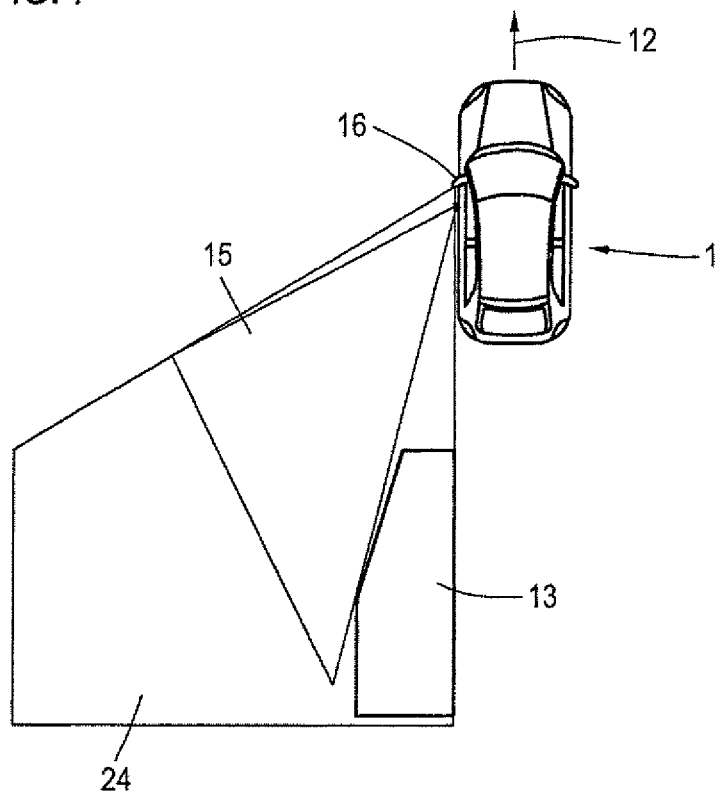

FIG. 7 shows the camera angle of a motor vehicle 1 with a camera situated in the front area and spaced apart from the vehicle body. The dead angle 15 is included within the field of view 24 of the camera, because the area 24 that is captured by the camera 16 provides a considerably greater angle in horizontal direction than the one of camera 16 in FIG. 5. The image generated by the camera 16 of FIG. 7 in the traffic situation described above is shown in FIG. 8. Here, the motor vehicle 22 is also visible next to the motor vehicle 20. However, it is to be taken into account that the display of the motor vehicle 20 is considerably smaller than in FIG. 6, even though image 21 is already noticeably wider. This is attributable to the significant enlargement of the horizontal opening angle of the camera 16 of FIG. 7. Compared to the opening angle 23 of camera 16 in FIG. 5 or the viewing angle of a conventional mirror, the opening angle of the displayed area 24 of the camera 16 in FIG. 7 is approximately three times larger. This is necessary to display the relatively large dead angle. This, however, leads to a drastic reduction in size of the display, which is not desirable and furthermore not permitted in all countries. An enlargement of the camera angle 16 of the camera as shown in FIG. 7 would thus only be possible with a significant enlargement of the display device. Alternatively, the part of the camera's 24 field of view that corresponds to the dead angle 15 can be displayed compressed or distorted within the processing device. This enables a more compact display; however, it is still necessary to place the camera in the front area and far outside of the vehicle body. As already described, this is disadvantageous for the design and aerodynamic drag of the motor vehicle.

Figure 8:
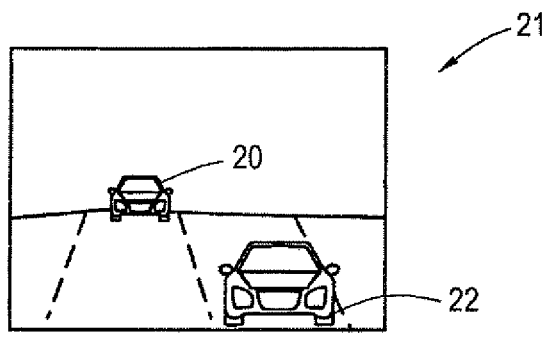
Figure 9:
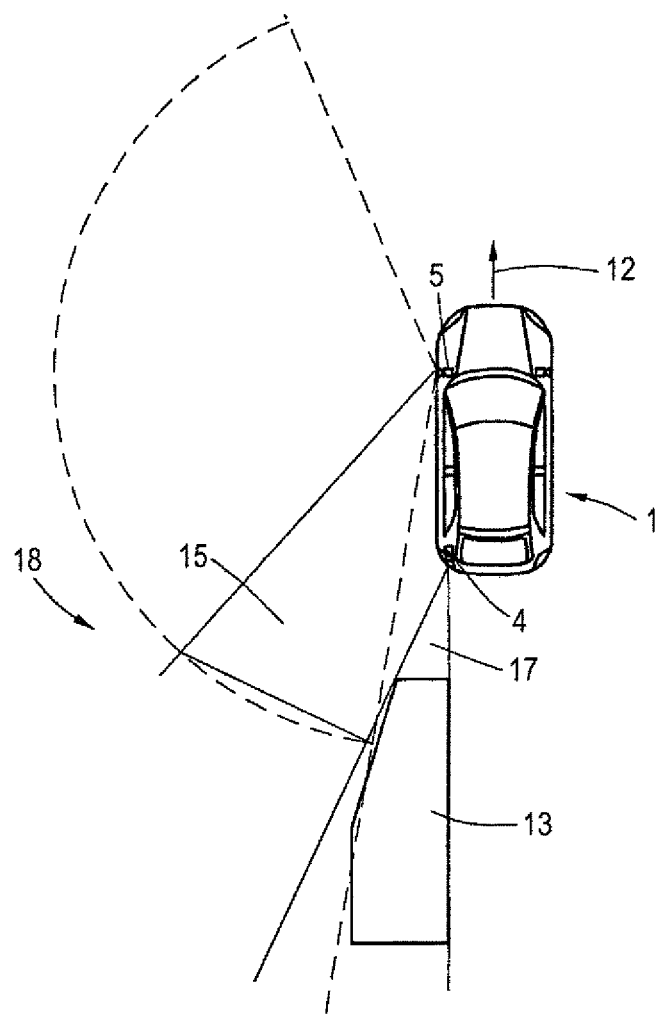
Figure 10:
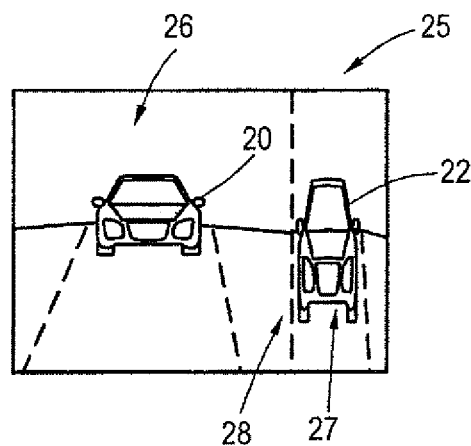

FIG. 9 shows the angles that are generated in a motor vehicle in which a wide-angled side camera as well as a rear area camera that is situated within the rear area of the vehicle are used to generate the image of a virtual mirror. In this case the minimum area 13 to be displayed lies within the detection area of the rear area camera 4. Rear area camera 4 actually has a greater camera angle, however, only those points are used that correspond to the spatial angle 17 to be recorded. These points are displayed in a first image region 26 that is shown in FIG. 10. The first image region 26 is as large as the image 19 of a conventional rearview mirror or of a corresponding camera-monitoring-system. At the same time, a wide-angled image of zone 18 that is situated laterally to the motor vehicle is captured by the side camera 5, which is also used as a top view camera within the motor vehicle 1. The dead angle 15 lies within this zone. From the image data of the camera 5, which represent a complete image of zone 18, the image region that corresponds to the dead angle 15 is calculated as already described. This area is additionally rectified and compressed in horizontal direction. This second image region 27 is also shown in FIG. 10. Thus, a target image 25 is displayed on the display device that is formed by the first image region 26 that essentially represents the image of a conventional rearview mirror, a marking 28 and a second image region 27 that represents the image data of the dead angle. With this image, the advantages of a conventional camera-monitoring-system as shown in FIGS. 5 and 6 and the advantages of a camera-monitoring-system with a wider display angle as shown in FIGS. 7 and 8 are achieved at the same time. Additionally, the rearview camera 4 as well as the side camera 5 can be integrated into the vehicle silhouette. This allows achieving a lower air resistance and offers new design possibilities.

The invention claimed is:

1. A motor vehicle, comprising:
two side cameras, one of said two side cameras being arranged on a left side of the motor vehicle and the other one of the two side cameras being arranged on a right side of the motor vehicle for a wide-angle capture of a respective zone situated to the left side and the right side of the motor vehicle;
a rear camera arranged on a rear side of the motor vehicle for imaging an area behind the motor vehicle, said two side cameras being spaced apart from the rear camera at least in a longitudinal direction of the motor vehicle, wherein a respective displayed spatial angle of the two side cameras overlaps with a displayed spatial angle of the rear area camera at least in a zone behind the motor vehicle;
two display devices; and
a processing device configured to generate a first target image from data obtained by the one of the two side cameras and the rear camera, and a second target image from data obtained from the other one of the two side cameras and the rear camera,
said first and second target image each comprising a first image region and a second image region arranged next to each other,
said first image region of the first and second target image displaying image data of the rear camera corresponding to a fixedly predefined spatial angle covered by the rear camera, said image data of the rear camera corresponding to a field of view of a conventional external rear mirror of a motor vehicle,
said second image region of the first target image displaying image data of the one of the two side cameras, said second region of the second target image displaying image data of the other one of the two side cameras, said image data of the two side cameras corresponding respectively to a fixedly predefined spatial angle respectively covered by the two side cameras
said processing device being configured to control one of the two display devices to display the first target image and to control the other one of the two display devices to display the second target image.

2. The motor vehicle of claim 1, further comprising another processing device configured to generate the second target image from the data obtained from the other one of the two side cameras and the rear camera, and to control the other one of the two display devices to display the second target image.

3. The motor vehicle of claim 1, wherein a detection angle of the two side cameras is larger than 90 degrees in a horizontal plane.

4. The motor vehicle of claim 1, wherein a detection angle of the two side cameras is larger than 120 degrees.

5. The motor vehicle of claim 1, wherein the displayed spatial angle of the two side cameras in horizontal plane is smaller than 90 degrees.

6. The motor vehicle of claim 1, wherein the displayed spatial angle of the two side cameras in horizontal plane is smaller than 60 degrees.

7. The motor vehicle of claim 1, wherein the displayed spatial angle of the two side cameras in horizontal plane is smaller than 45 degrees.

8. The motor vehicle of claim 1, wherein a size of the first and second image regions is fixedly predefined.

9. The motor vehicle of claim 1, wherein the processing device is configured to rectify the image data of the two side cameras.

10. The motor vehicle of claim 1, wherein the processing device is configured to compress the image data of the two side cameras in horizontal direction to produce the image data of the second image region.

11. The motor vehicle of claim 1, wherein the processing device, is configured to generate a marking in the first and second target image that marks a border between the first and the second image regions.

12. The motor vehicle of claim 1, wherein the first and second target images are respectively displayed over an entire respective surface of the two display devices.

13. The motor vehicle of claim 1, further comprising another rear area camera, wherein the first image region of the first target image displays image data of the rear area camera and the first image region of the second target image displays image data of the other rear area camera.

* * * * *